M. A. Wheaton,
Mower.

No. 49,186 — Patented Aug. 1, 1865.

Inventor
Milton A. Wheaton
By Dewey &co
Attys

Witnesses
John H. Roberts
E. E. Hathaway

UNITED STATES PATENT OFFICE.

MILTON A. WHEATON, OF SUISUN CITY, CALIFORNIA.

IMPROVEMENT IN HARVESTING-MACHINES.

Specification forming part of Letters Patent No. 49,186, dated August 1, 1865.

*To all whom it may concern:*

Be it known that I, MILTON A. WHEATON, of Suisun City, Solano county, State of California, have invented certain new and useful Improvement in Reaping, Mowing, and Heading Machines; and I do hereby declare that the following is a full, clear, and exact description of the same, reference being had to the accompanying drawings, making a part of this specification, in which—

Figure 1:
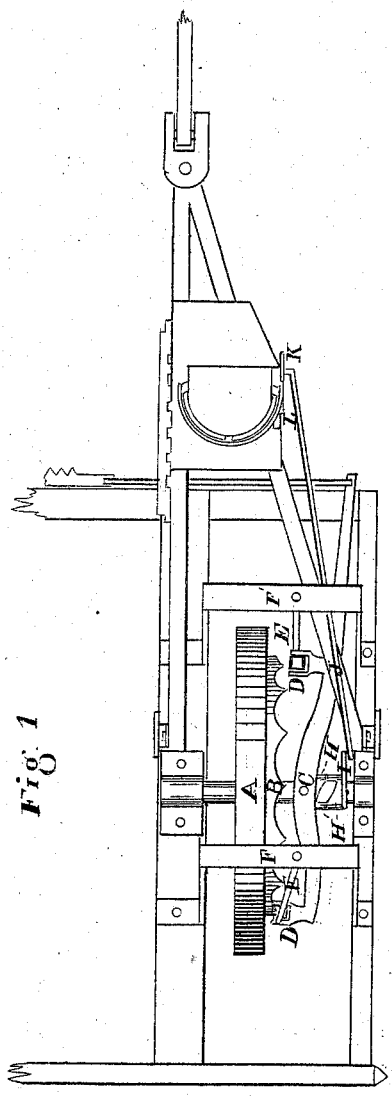
Figure 2:
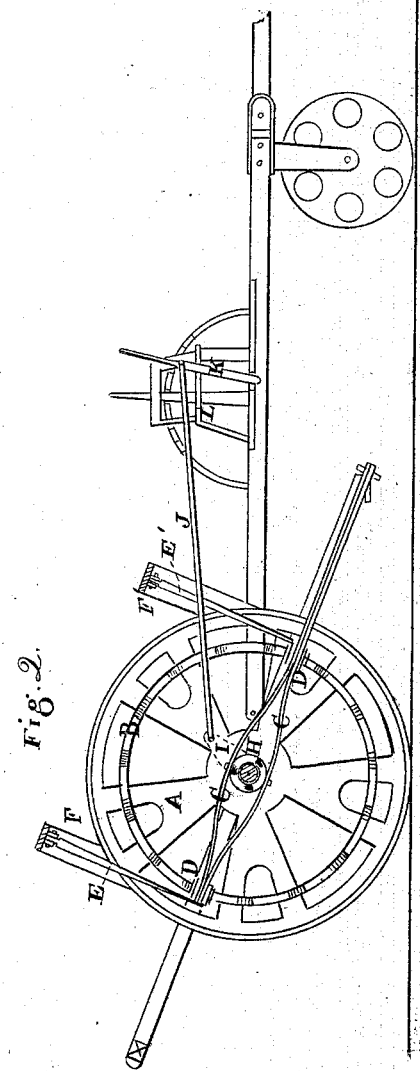

Figure 1 is a plan or top view of a harvester having my improvements. Fig. 2 is a side view of the same.

Similar letters of reference indicate like parts in the two figures.

This invention consists in an improved means for throwing the sickle of the reaper or mower out of gear.

It also relates to the employment or use of oscillating bars suspended above the machine for the purpose of holding the friction-rollers in place.

The object of my invention is to avoid the friction of guides or sliding surfaces of any kind.

To enable others skilled in the art to make and use my invention, I will proceed to describe it.

In the accompanying drawings, Figs. 1 and 2, A represents the driving-wheel, in which is placed the cam-rim B, and upon which the friction-rollers D D' revolve, and are held firmly against the cam-teeth by means of the vibrating lever C, and to which the collar H is attached, encircling the driving-shaft. I place another collar, H', upon the shaft, to which is attached a lever, I, which is moved by the connecting-rod J and lever K. Each collar contains one or more depressions and projections on its face, and when the lever is moved backward the depressions on one collar correspond with the projections on the other, so that the vibrating bar C, together with the friction-rollers D D', can be thrown away from the cam-rim B, and thus preventing the motion of the sickle or knives when required. When the lever I is thrown forward the projections in one collar correspond with those of the other and force the vibrating bar C against the cam-rim B, so that motion can be communicated to the sickle.

To the ends D D' of the vibrating bar C are attached the oscillating rods E E', suspended by jointed connections from the bars F F', which are elevated above the frame for the purpose of avoiding the friction of guides and sliding surfaces, and at the same time to allow the friction-rollers D D' to be moved easily to and from the teeth of the cam-rim B and prevent them from being moved up and down.

The collar H, to which is attached the lever I, is kept in place by means of a pin passing through the driving shaft, or by another stationary collar.

These improvements are intended for use upon every kind of harvester to which they can be applied, whether the same be reapers, headers, or mowers.

Having thus described my improvement in harvesters so as to enable any one skilled in the art to make and use them, I will now state what claim and desire to secure by Letters Patent:

1. In combination with the cam-teeth B, the employment or use of the friction-rollers D D' and the jointed vibrating rods E E', or their equivalents, for the purpose specified and set forth.

2. The employment or use of the collars H H', or their equivalent, with the depressions and projections, substantially as and for the purpose specified.

In witness whereof I have hereunto set my hand and seal this 29th day of April, A. D. 1865.

M. A. WHEATON. [L. S.]

Witnesses:
JOHN H. ROBERTS,
E. E. HATHAWAY.